US012809168B2

(12) United States Patent
Devaraj et al.

(10) Patent No.: US 12,809,168 B2
(45) Date of Patent: Nov. 24, 2026

(54) ROTARY LOCKING MOUNTING PROCESS FOR REFLECTION DEVICE OF A HEAD UP DISPLAY

(71) Applicant: VALEO COMFORT AND DRIVING ASSISTANCE, Créteil (FR)

(72) Inventors: Seshadri Devaraj, Troy, MI (US); Selvakumar Natarajan, Troy, MI (US); Shankar Duraisamy, Troy, MI (US)

(73) Assignee: Valeo Comfort And Driving Assistance, Créteil (FR)

( * ) Notice: Subject to any disclaimer, the term of this patent is extended or adjusted under 35 U.S.C. 154(b) by 247 days.

(21) Appl. No.: 18/627,337

(22) Filed: Apr. 4, 2024

(65) Prior Publication Data

US 2025/0314884 A1 Oct. 9, 2025

(51) Int. Cl.
*G02B 27/01* (2006.01)
*F16C 11/06* (2006.01)

(52) U.S. Cl.
CPC .......... *G02B 27/0149* (2013.01); *F16C 11/06* (2013.01)

(58) Field of Classification Search
CPC ........ G02B 27/0149; G02B 2027/0154; G02B 2027/0181; F16C 11/06
USPC .......................................................... 359/630
See application file for complete search history.

(56) References Cited

U.S. PATENT DOCUMENTS

| | | | | |
|---|---|---|---|---|
| 10,416,448 | B2 | 9/2019 | Furusawa et al. | |
| 2015/0226964 | A1* | 8/2015 | Sasaki | B60K 35/233 359/631 |
| 2018/0039080 | A1* | 2/2018 | Lambert | B60K 35/23 |
| 2018/0373037 | A1* | 12/2018 | Shin | B60K 35/231 |
| 2019/0219823 | A1* | 7/2019 | Henon | B60K 35/231 |
| 2020/0338944 | A1 | 10/2020 | Henon et al. | |
| 2022/0283436 | A1* | 9/2022 | Le Toumelin | B60K 35/23 |
| 2023/0054971 | A1* | 2/2023 | Hada | B60K 35/10 |
| 2024/0075813 | A1* | 3/2024 | Le Toumelin | B60K 35/23 |

FOREIGN PATENT DOCUMENTS

| | | | |
|---|---|---|---|
| DE | 102020132549 | A1 | 6/2022 |
| FR | 3023926 | A1 | 1/2016 |
| JP | 2019162904 | A | 9/2019 |

OTHER PUBLICATIONS

International Search Report in corresponding International Application No. PCT/US2025/022854, dated Jul. 3, 2025 (3 pages).
Written Opinion in corresponding International Application No. PCT/US2025/022854, dated Jul. 3, 2025 (4 pages).

* cited by examiner

*Primary Examiner* — Mohammed A Hasan
(74) *Attorney, Agent, or Firm* — Valeo Comfort And Driving Assistance

(57) ABSTRACT

A reflection device of a Head Up Display (HUD) includes a support rigidly fixed to a housing of the HUD, a frame rotatable about a first axis, a reflection element, and a plurality of rotary rings that couple the support and the frame. The reflection element includes a first side fixed to the frame and a second side that is reflective and opposite of the first side.

16 Claims, 9 Drawing Sheets

ROTARY LOCKING MOUNTING PROCESS FOR REFLECTION DEVICE OF A HEAD UP DISPLAY

BACKGROUND

A Head Up Display (HUD) is a system well known in the art that projects information into the field of vision of a user of a vehicle, thereby permitting the user to maintain both their line of sight of an external environment of the vehicle and their head position. Generally, a HUD includes a Picture Generating Unit (PGU), such as a projector, and a reflection device. The PGU projects a virtual image containing information onto a reflection element, such as a mirror, of the reflection device in order to reflect the virtual image onto a transparent combiner or windshield of the vehicle.

In order to accommodate different sizes and proportions of different users or to prevent sun damage to the PGU, the reflection element of a reflection device is often rotatable. Accordingly, the reflection element may be rotated to various angles in order to project the virtual image at different locations on the combiner or windshield of the vehicle. However, HUD systems are often susceptible to external forces or vibrations, such as in the instance the vehicle travels over an unpaved roadway. To this end, it is common for a rotatable reflection element to be moved out of a desired position in the instance the HUD experiences these external forces or vibrations.

SUMMARY

One or more embodiments of the present invention relate to a reflection device of a Head Up Display (HUD) that includes a support rigidly fixed to a housing of the HUD, a frame rotatable about a first axis, a reflection element, and a plurality of rotary rings that couple the support and the frame. The reflection element includes a first side fixed to the frame and a second side that is reflective and opposite of the first side.

One or more embodiments of the present invention relate to a method for mounting a reflection device of a HUD and positioning a reflection element of the reflection device within a housing of the HUD. The method includes fixing a support of the reflection device to the housing of the HUD, securing a first side of the reflection element to a frame of the reflection device, coupling the support and the frame by a plurality of rotary rings, and rotating the frame about a first axis. The reflection element further includes a second side that is reflective and opposite of the first side.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments disclosed herein are directed towards reflection devices of a Head Up Display (HUD) and methods useful for mounting reflection devices of a HUD. In one or more embodiments, the reflection device includes a support, a frame, a reflection element, and a plurality of rotary rings. The techniques discussed in this disclosure are beneficial as they employ a more robust design than current reflection devices in the industry by employing a snap-fit assembly. Further, the techniques discussed in this disclosure are beneficial as they provide an easier and more reliable assembly compared to current reflection devices in the industry. In addition, the techniques discussed in this disclosure are beneficial as they ensure smooth operation and eliminate freeplay and noise within the devices.

Figure 1:
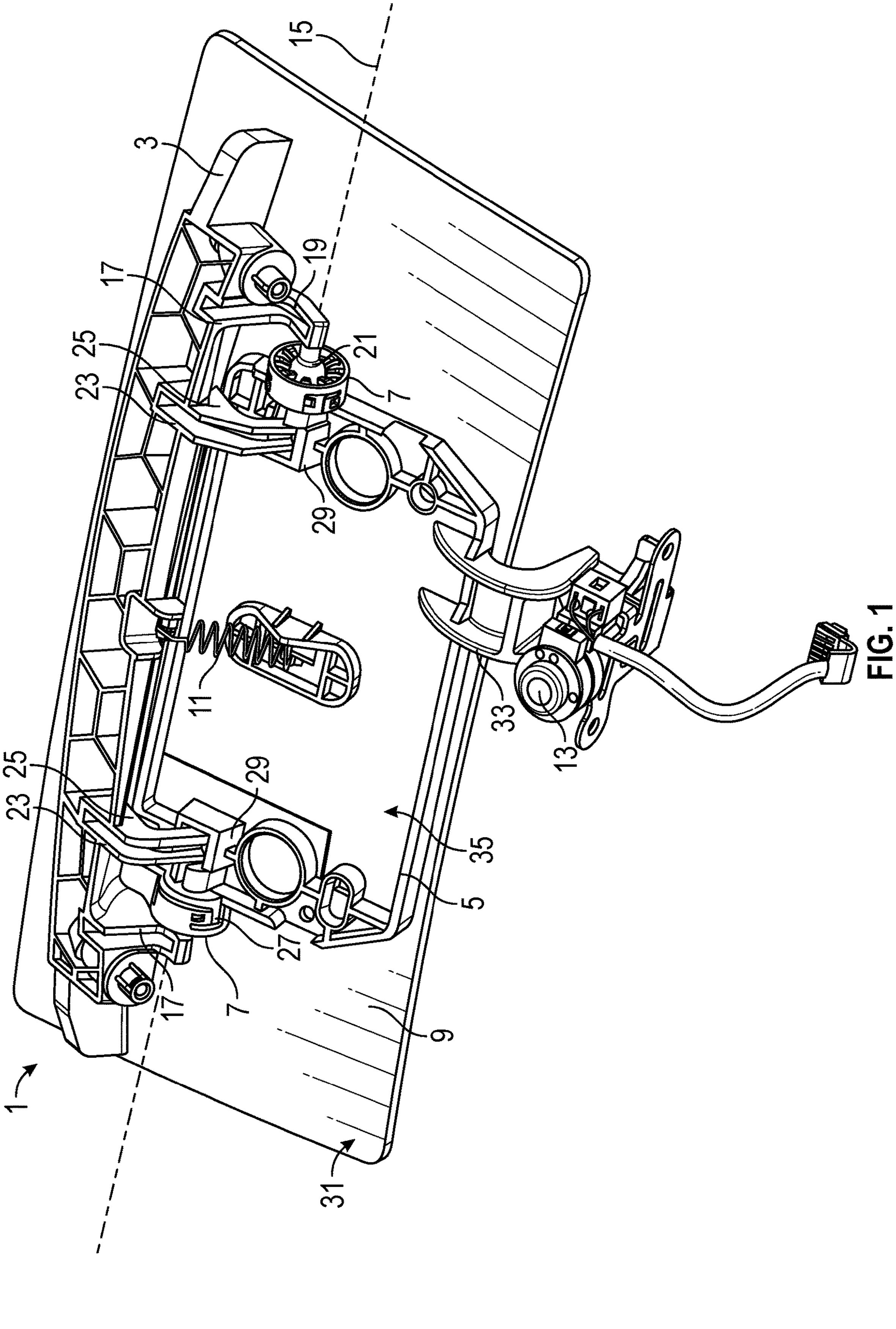
FIG. 1 shows a reflection device in accordance with one or more embodiments of the present disclosure.

FIG. 1 depicts a reflection device 1 of a HUD (not shown) in accordance with one or more embodiments of the present disclosure. The reflection device 1 includes a support 3, a frame 5, a plurality of rotary rings 7, and a reflection element 9. In one or more embodiments the reflection device 1 further includes a spring 11 and a rotation mechanism 13. For the sake of simplification, only components of the reflection device 1 relevant to the present disclosure are shown.

In one or more embodiments, the support 3 of the reflection device 1 is rigidly fixed (i.e., via screws, bolts, glue, snap connectors, etc.) to a housing (not shown) of the HUD. The support 3 may be formed of a polymer through an injection mold or additive manufacturing process and extend in a direction parallel to a first axis 15 of the reflection device 1. Further, the support 3 may be beam-like in shape. The support 3 includes a plurality of coupling legs 17 that may be an integrally formed component of the support 3 or connected (i.e., via a bolt, screw, etc.) to the support 3. Each coupling leg 17 of the plurality of coupling legs 17 includes a rod 19 that protrudes from the support 3 in a direction perpendicular to the first axis 15, and a coupling element 21 that extends along the first axis 15 from the rod 19. In one or more embodiments, the coupling element 21 may be spherical or cylindrical in shape.

In one or more embodiments, the support 3 further includes a plurality of stopping legs 23 that may be an integrally formed component of the support 3 or connected (i.e., via a bolt, screw, etc.) to the support 3. Each stopping leg 23 of the plurality of stopping legs 23 includes a beam 25 that protrudes from the support 3 in a direction perpendicular to the first axis 15, and a stopping element (e.g., FIG. 7) that extends from the beam 25 along the first axis 15. In one or more embodiments, the stopping elements may be rectangular or cylindrical.

The frame 5 of the reflection device 1 may similarly be formed of a polymer material through an injection mold or additive manufacturing process. Further, the frame 5 may be plate-like in shape. The frame 5 may include a plurality of integrally formed coupling members 27 and a plurality of integrally formed stopping members 29. To this end, each coupling member 27 of the frame 5 is coupled to a coupling leg 17 of the support 3 by a rotary ring 7 of the plurality of rotary rings 7. In this way, the plurality of rotary rings 7 couple the support 3 and the frame 5. In one or more embodiments, the plurality of rotary rings 7 are formed of a polymer material through an injection mold or additive manufacturing process. The structure of the plurality of rotary rings 7 is further detailed in FIG. 3, which shows a cross-sectional view of a rotary ring 7 in accordance with one or more embodiments of the present disclosure. In addition, the structure of the plurality of coupling members 27 is further detailed in FIG. 2, which shows a perspective view of a reflection device 1 in accordance with one or more embodiments of the present disclosure.

Further, each stopping member 29 of the frame 5 is configured to receive a stopping element (e.g., FIG. 7) of a stopping leg 23 of the support 3. The structure of the plurality of stopping members 29 is further detailed in FIG. 7, which shows a perspective view of a reflection device 1 in accordance with one or more embodiments of the present disclosure.

In one or more embodiments, the plurality of stopping members 29 and the plurality of coupling members 27 of the frame 5 are aligned along the first axis 15. Further, in one or more embodiments, the plurality of stopping members 29 are directly connected to the plurality of coupling members 27 along the first axis 15.

The reflection element 9 of the reflection device 1 includes a first side 31 that is secured (i.e., via glue, tape, suction, etc.) to a front side (not shown) of the frame 5 in order for the frame 5 to support the reflection element 9. A second side (not shown) of the reflection element 9 is reflective and utilized to reflect radiation emitted by a Picture Generating Unit (PGU) (not shown) of the HUD onto a transparent combiner (not shown) or windshield (not shown) of a vehicle (not shown). In one or more embodiments, the first side 31 and the second side the reflection element 9 may be reflective. As such, the reflection element 9 may be formed of glass, plastic, or merely include a reflective coating. In addition, in one or more embodiments, the reflection element 9 is curved and concaved.

Further, in one or more embodiments, the frame 5 is configured to rotate about the first axis 15 in relation to the support 3 in order to alter the position of the reflection element 9 within the housing of the HUD. Specifically, the frame 5 may include a leg 33 that protrudes from a back side 35 of the frame 5, extending in a direction perpendicular to the first axis 15. The leg 33 is connected to an end of a rotation mechanism 13 configured to apply a force upon the leg 33 in order to rotate the frame 5 about the first axis 15. In one or more embodiments, the force applied by the rotation mechanism 13 is a linear force in a direction perpendicular to the first axis 15. As such, the rotation mechanism 13 may be in the form of a linear actuator. In one or more embodiments, the rotation mechanism 13 may be electric, as depicted in FIG. 1, and fixed to the housing of the HUD.

In one or more embodiments, the degree of rotation of the frame 5 in a first direction of rotation (not shown) and/or a second direction of rotation (not shown) may be limited by the rotation mechanism 13 itself. Specifically, in the instance that the rotation mechanism 13 is a linear actuator, an extension distance of a plunger (not shown) of the linear actuator may be limited. Alternatively, programming of the HUD may limit the extension distance of the linear actuator. In one or more embodiments, the rotation of the frame 5 may instead be limited by the support 3. In particular, the degree of rotation of the frame 5 in a first direction of rotation may be limited subsequent to the reflection element 9 abutting against a front face (not shown) of the support 3. Further, in one or more embodiments, the stopping member 29 may act as a stop, limiting the rotation of the frame 5. That is, the distal end of a stopping leg 23 within the stopping member 29 may abut against a wall of the recess, thereby preventing further rotation of the frame 5 in relation to the support 3 about the first axis 15.

In addition, the support 3 and the frame 5 may also be connected to one another by a spring 11 for added stability between the support 3 and the frame 5 and additional support for the rotation mechanism 13. The spring 11 is a tensile spring and may be formed of alloyed or stainless steel. Specifically, a first end of the spring 11 is connected to the support 3 and a second end of the spring 11 is connected to a back side 35 of the frame 5 such that the spring 11 extends in a direction perpendicular to the first axis 15.

The spring 11 may be connected to the support 3 and the frame 5 by any connection means known to those of ordinary skill in the art. Accordingly, the spring 11 may apply a preloaded force between the support 3 and the frame 5 in order to maintain the frame 5 in a desired position in relation to the support 3.

Figure 2:
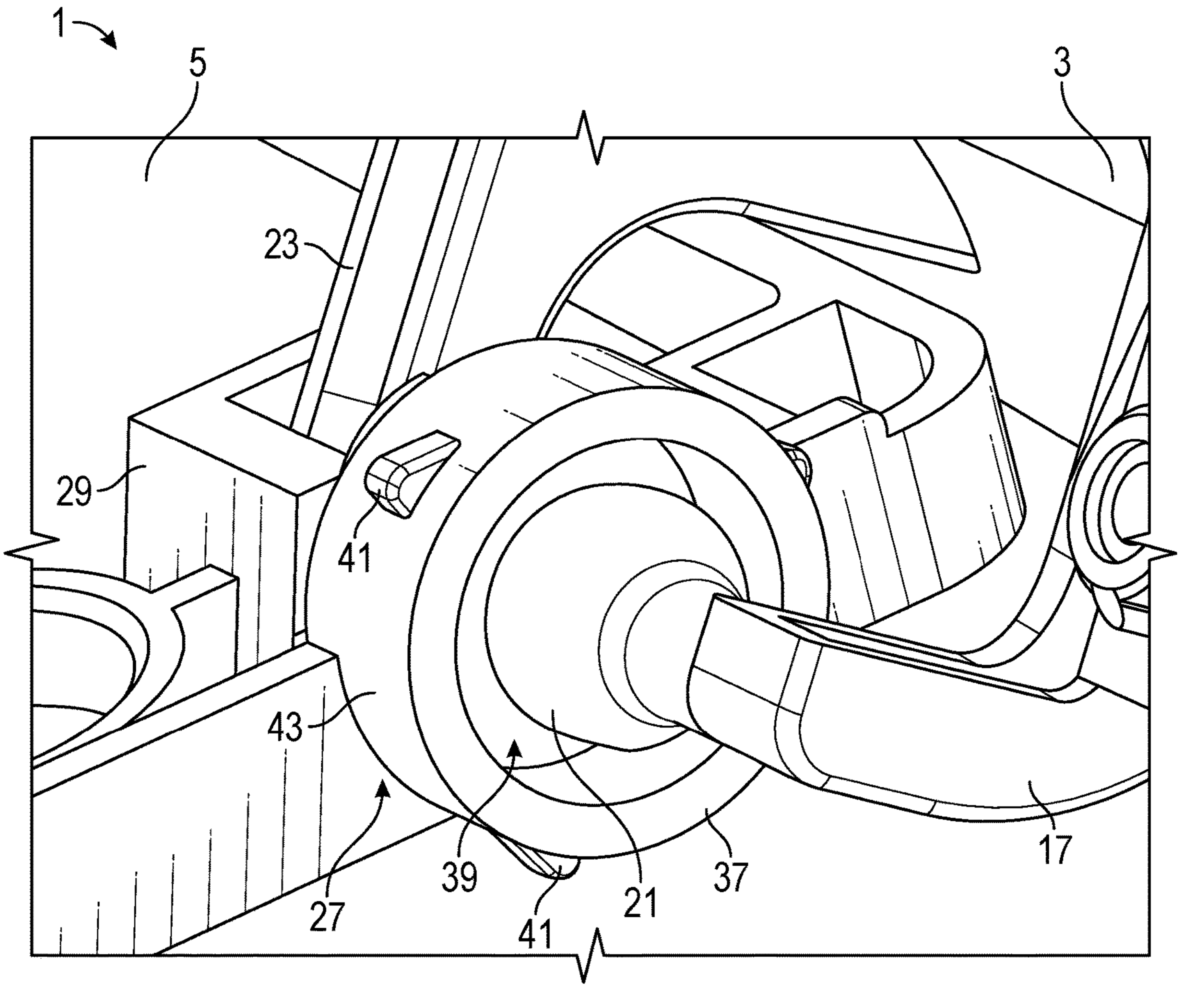
FIG. 2 shows a perspective view of a reflection device in accordance with one or more embodiments of the present disclosure.

FIG. 2 shows a coupling member 27 of the frame 5 in accordance with one or more embodiments of the present disclosure. In one or more embodiments, each coupling member 27 of the plurality of coupling members 27 is formed as a cylindrical protrusion 37 extending outwardly from a lateral end of the frame 5 in a direction parallel to the first axis 15. In addition, the cylindrical protrusion 37 of each coupling member 27 includes a first recess 39 in a direction parallel to the first axis 15 such that the first recess 39 is configured to receive a coupling element 21 of a coupling leg 17 of the support 3. However, during operation of the reflection device 1, the coupling member 27 is not in direct contact with the coupling element 21.

Further, each coupling member 27 includes a plurality of noses 41 extending outwardly from an outer surface 43 of the cylindrical protrusion 37 in a direction perpendicular to the first axis 15. In one or more embodiments, the plurality of noses 41 may be tapered. The plurality of noses 41 are designed to couple a coupling member 27 with a rotary ring 7.

Figure 3:
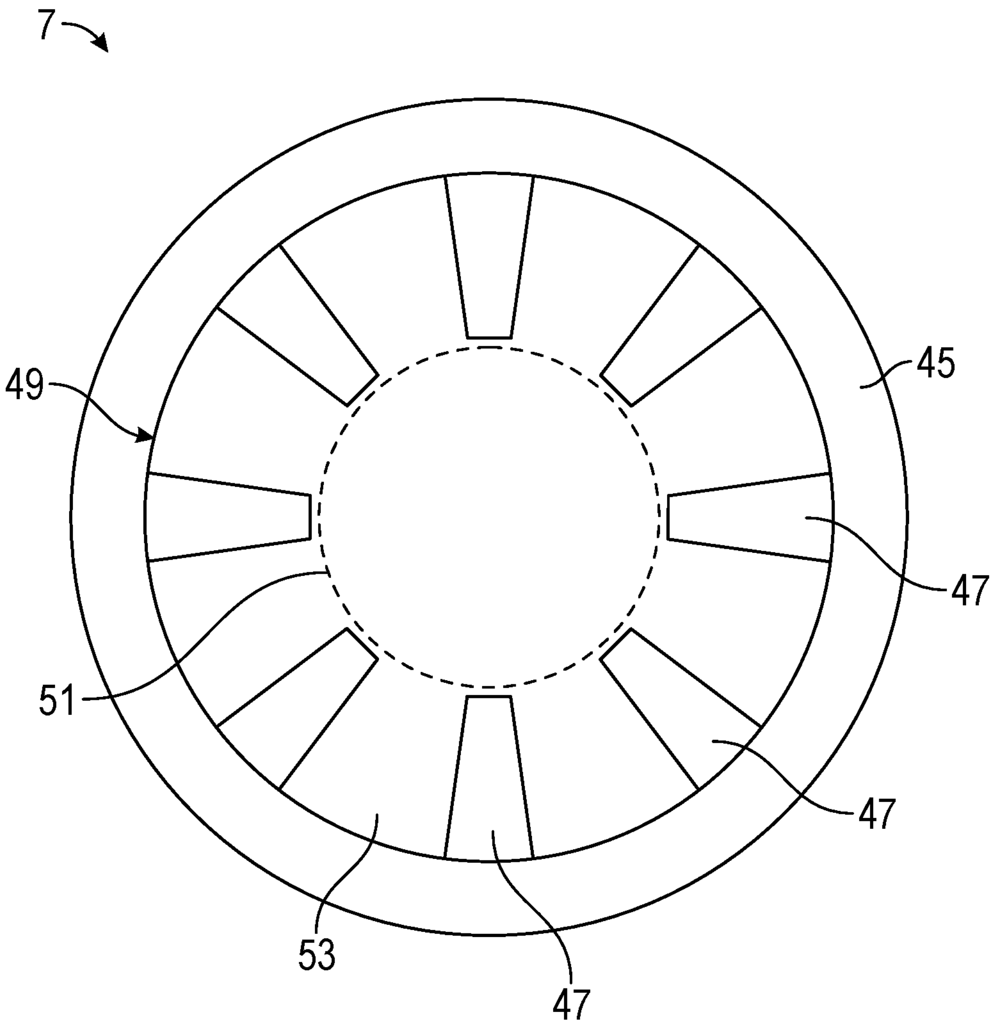
FIG. 3 shows a cross-sectional view of a rotary ring in accordance with one or more embodiments of the present disclosure.

FIG. 3 shows a cross-sectional view of a rotary ring 7 in accordance with one or more embodiments of the present disclosure. Each rotary ring 7 of the plurality of rings 7 is designed to couple a coupling leg 17 of the support 3 to a coupling member 27 of the frame 5. In one or more embodiments, a rotary ring 7 includes a tubular body 45 and a plurality of fingers 47 protruding in a direction perpendicular to the first axis 15 from an interior wall 49 of the body 45. The plurality of fingers 47 may include at least three fingers 47. The free ends (i.e., ends of the plurality of fingers 47 not attached to the body 45 of the rotary ring 7) of the plurality of fingers 47 form a circular gap or finger opening 51 within an opening 53 of the body 45. In this way, a rotary ring 7 is configured to receive a coupling element 21 of a coupling leg 17 through the finger opening 51 of the rotary ring 7. Further, the plurality of fingers 47 may be tapered and/or designed to elastically deform in a single direction such as an insertion direction (e.g., FIG. 4) of the coupling element 21 which is parallel to the first axis 15. To this end, the plurality of fingers 47 are designed to couple a rotary ring 7 with a coupling element 21 of a coupling leg 17 of the support 3.

Figure 4:
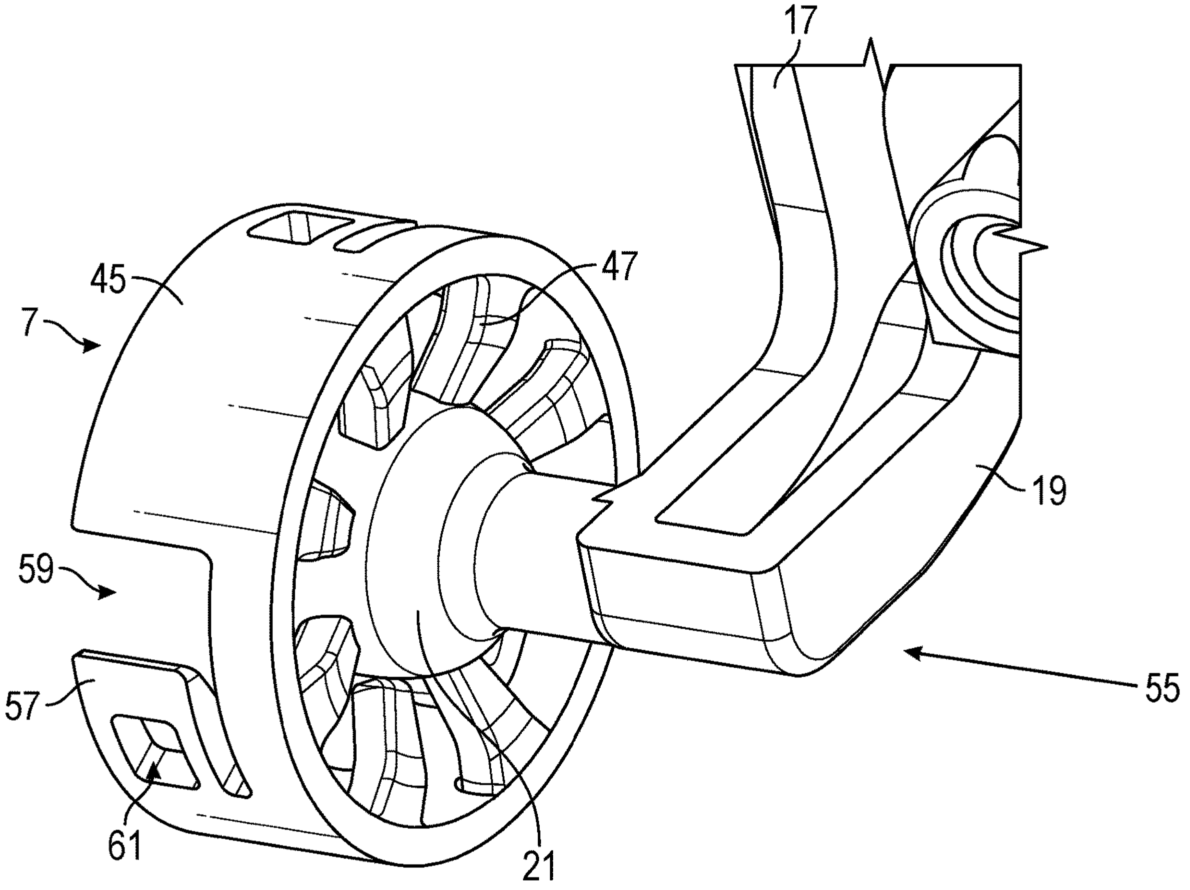
FIG. 4 shows a rotary ring coupled to a coupling leg of a support in accordance with one or more embodiments of the present disclosure.

FIG. 4 shows a rotary ring 7 coupled to a coupling leg 17 of the support 3 in accordance with one or more embodiments of the present disclosure. Specifically, during assembly of the reflection device 1, a rotary ring 7 is coupled to a coupling element 21 by inserting the coupling element 21 through the finger opening 51 of the rotary ring 7 along an insertion direction 55. In one or more embodiments, the diameter of the finger opening 51 is less than the diameter of the coupling element 21. Accordingly, the plurality of fingers 47 may deform elastically in the insertion direction 55 to accommodate the diameter of the coupling element 21. In the instance the coupling element 21 is spherical, as depicted in FIG. 4, the plurality of fingers 47 may return or bend back into a resting position of the plurality of fingers 47 subsequent to the largest circumference of the coupling element 21 passing through the finger opening 51. Consequently, in one or more embodiments, the coupling element 21 cannot exit through the finger opening 51 in a direction opposite of the insertion direction 55 due to the shape and/or the one-way bend of the plurality of fingers 47.

The body 45 of a rotary ring 7 further includes a plurality of snaps 57. The plurality of snaps 57 are formed by a plurality of notches 59 or cutouts along the body 45. In addition, each snap 57 of the plurality of snaps 57 includes a window 61 or an aperture that is configured to receive a nose 41 of a coupling member 27 in order to couple the rotary ring 7 and the coupling member 27. In one or more embodiments, the number of snaps 57 along the body 45 of a rotary ring 7 is identical to the number of noses 41 along a coupling member 27.

Figure 5:
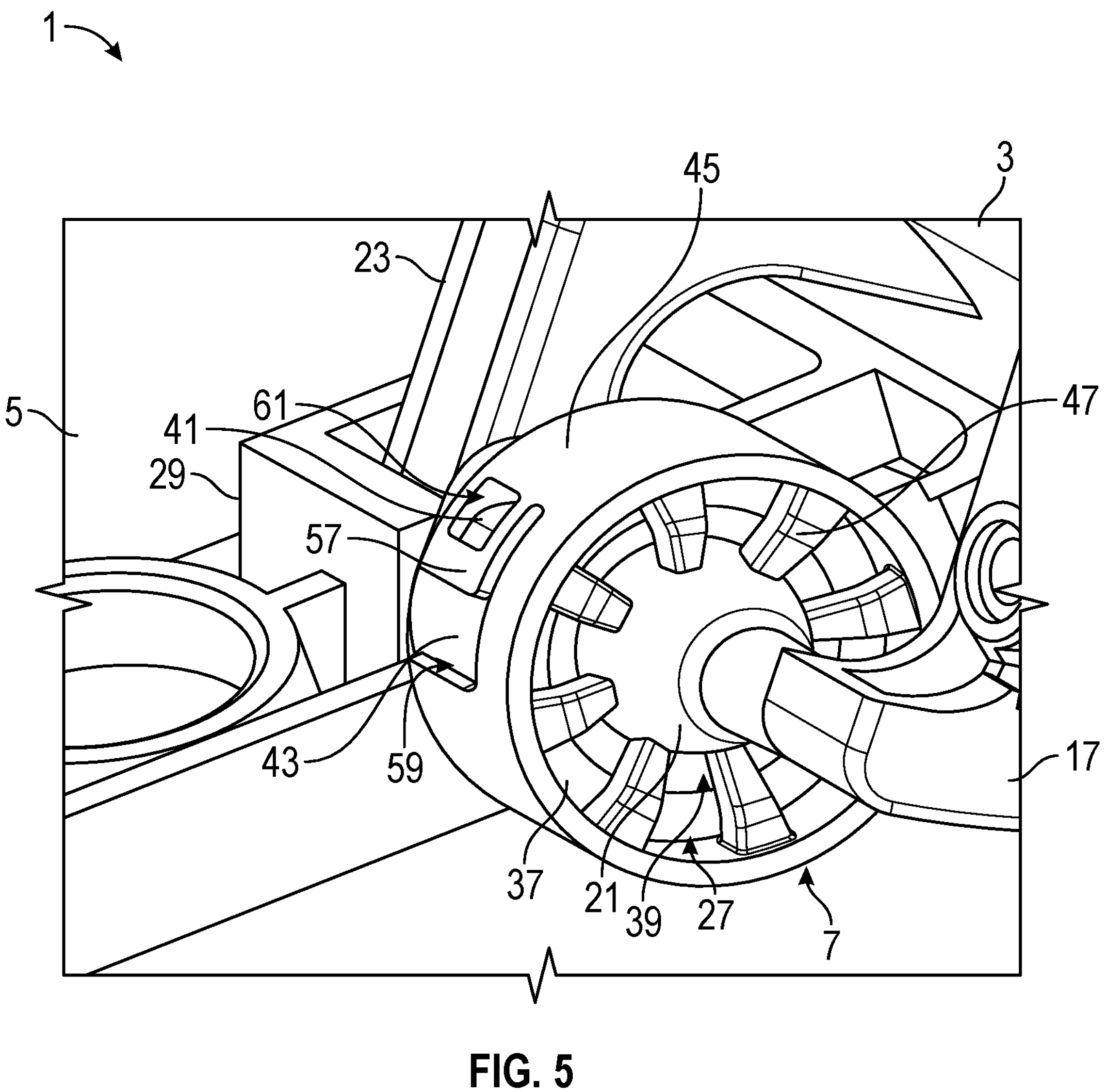
FIG. 5 shows a perspective view of a reflection device in accordance with one or more embodiments of the present disclosure.

FIG. 5 shows a rotary ring 7 coupled to a coupling leg 17 of the support 3 and to a coupling member 27 of the frame 5 in accordance with one or more embodiments of the present disclosure. Prior to the rotary ring 7 being coupled to the coupling member 27, the rotary ring 7 may be coupled to the coupling leg 17 according to the operational sequence described in FIG. 4. Subsequently, the rotary ring 7 is coupled to the coupling member 27 of the frame 5, thereby coupling the support 3 and the frame 5. The operational sequence of coupling a rotary ring 7 to a coupling member 27 in accordance with one or more embodiments is detailed in FIGS. 6A and 6B.

Subsequent to the rotary ring 7 being coupled to the coupling member 27, the cylindrical protrusion 37 of the coupling member 27 is disposed within the opening 53 of the body 45. In one or more embodiments, the outer diameter of the cylindrical protrusion 37 is similar to the diameter of the interior wall 49 of the body 45.

In addition, subsequent to the rotary ring 7 being coupled to the coupling member 27, the coupling element 21 of the coupling leg 17 is disposed within the first recess 39 of the coupling member 27. As previously described, during operation of the reflection device 1, the coupling member 27 is not in direct contact with the coupling element 21. Rather, the coupling element 21 is supported and secured by the plurality of fingers 47 of the rotary ring 7. In one or more embodiments the plurality of fingers 47 abut against the coupling element 21 just beyond the largest circumference of the coupling element 21, with respect to the extension direction of the coupling element 21, due to the position of the coupling leg 17 with respect to the coupling member 27 and the position of the plurality of fingers 47 along the interior wall 49 of the body 45 of the rotary ring 7.

Furthermore, subsequent to the coupling of the rotary ring 7 and the coupling member 27, the plurality of noses 41 of the coupling member 27 are disposed within corresponding windows 61 of the plurality of snaps 57 of the rotary ring 7. Consequently, the rotary ring 7 is prevented from rotating about the first axis 15 in relation to the coupling member 27 while the plurality of noses 41 are disposed within corresponding windows 61 of the plurality of snaps 57. However, during rotation of the frame 5, the rotary ring 7 is configured to rotate about the first axis 15 in relation to the coupling element 21. Since contact between the coupling element 21 and the plurality of fingers 47 is merely point contact, there is little friction between the coupling element 21 and the rotary ring 7 during rotation of the frame 5.

Figure 6A:
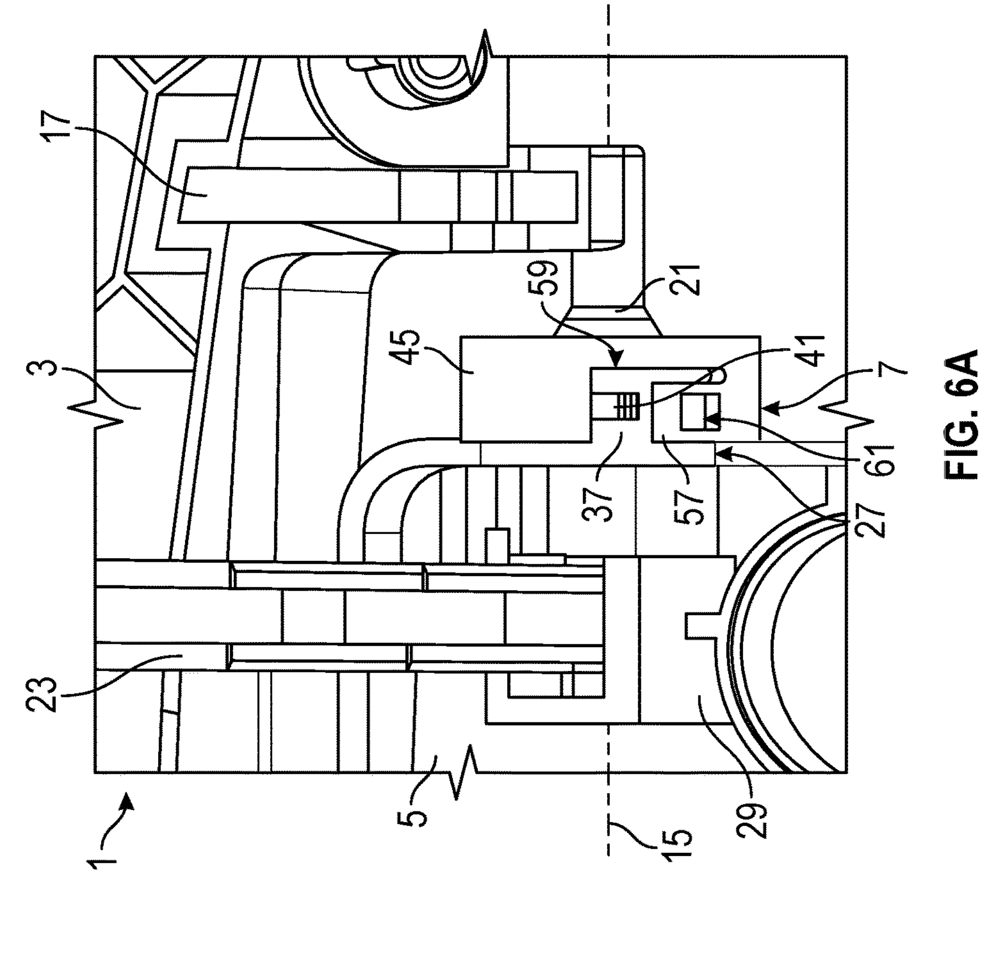
FIGS. 6A and 6B show diagrams depicting an operational sequence of the reflection device in accordance with one or more embodiments.
Figure 6B:
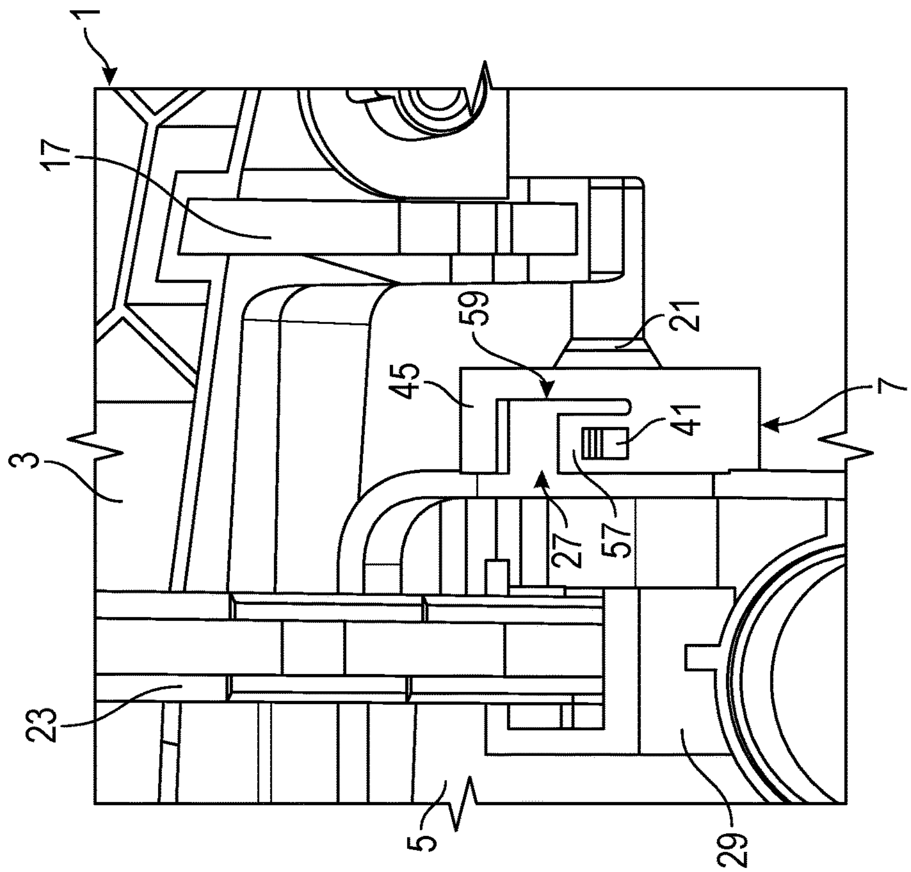

FIGS. 6A and 6B show diagrams depicting the operational sequence of a rotary ring 7 in order to couple the support 3 and the frame 5 of a reflection device 1 in accordance with one or more embodiments. Specifically, FIGS. 6A and 6B show a rotary ring 7 before and after being coupled to a coupling member 27. Components of FIGS. 6A and 6B that are the same as or similar to components depicted in FIGS. 1-5 have not been redescribed for purposes of readability and have the same functions as those described above.

FIG. 6A depicts a rotary ring 7 subsequent to being coupled to a coupling leg 17 of the support 3 but prior to being coupled to a coupling member 27 of the frame 5. In the position shown in FIG. 6A, the body 45 of the rotary ring 7 has been placed over the cylindrical protrusion 37 of the coupling member 27. In this way, the coupling element 21 coupled to the rotary ring 7 by the plurality of fingers 47 of the rotary ring 7 is disposed within the first recess 39 of the coupling member 27.

In one or more embodiments, during placement of the body 45 of a rotary ring 7 upon the cylindrical protrusion 37 of the coupling member 27, the plurality of notches 59 of the body 45 of the rotary ring 7 must align with the plurality of noses 41 along the cylindrical protrusion 37 of the coupling member 27. Subsequent to the placement of the body 45 of a rotary ring 7 upon the cylindrical protrusion 37 of the coupling member 27, each nose 41 of the plurality of noses 41 are disposed within a corresponding notch 59 of the plurality of notches 59.

FIG. 6B depicts the rotary ring 7 coupled to the coupling member 27 subsequent to the rotary ring 7 being rotated about the first axis 15 in relation to the coupling member 27. In one or more embodiments, the coupling member 27 and the coupling element 21 are stationary while the rotary ring 7 is rotated about the first axis 15. In this way, plurality of snaps 57 of the body 45 of the rotary ring 7 are passed over the plurality of noses 41 of the cylindrical protrusion 37 of the coupling member 27 until the plurality of noses 41 are disposed within the windows 61 of the plurality of snaps 57. Subsequently, the plurality of noses 41 abut against the interiors of the plurality of snaps 57 formed by the windows 61, thereby preventing further rotation of the rotary ring 7. In this position, the rotary ring 7 is thereby coupled to the coupling member 27.

In one or more embodiments, the lengths and the widths of the plurality of noses 41 and the lengths and the widths of the windows 61 may be similar and within predetermined tolerances. As such the contact between the plurality of snaps 57 and the plurality of noses 41 eliminates the possibility of noise, freeplay between the windows 61 and the plurality of noses 41, and/or further movement of the body 45 upon the coupling member 27. In this way, once a rotary ring 7 is coupled to a coupling member 27, the rotary ring 7 is thereby rigidly fixed to the coupling member 27.

In one or more embodiments, the plurality of snaps 57 may deform elastically while traveling over the plurality of noses 41. The plurality of snaps 57 may return to their previous form subsequent to the plurality of noses 41 entering the windows 61. As such, in one or more embodiments, the plurality of rotary rings 7 couple to corresponding coupling members 27 via snap-fit designs of the plurality of snaps 57 and the plurality of noses 41. Further, in one or more embodiments, the plurality of noses 41 and/or the plurality of snaps 57 may be tapered (e.g., as depicted in FIG. 2 and FIG. 4, respectively) in order to reduce the stress within the plurality of snaps 57 during the coupling process.

In addition, in one or more embodiments, the rotation of the rotary ring 7 about the first axis 15 is not limited to the clockwise or counter-clockwise directions in order to couple the rotary ring 7 to the coupling member 27.

The support 3 and the frame 5 of the reflection device 1 are coupled to one another subsequent to the plurality of rotary rings 7 being coupled to the plurality of coupling members 27. To this end, during rotation of the frame 5 about the first axis 15 in relation to the support 3, the plurality of rotary rings 7, rigidly fixed to the plurality of coupling members 27, are rotated in unison with the frame 5 about the first axis 15 and corresponding coupling elements 21.

In one or more embodiments, the plurality of rotary rings 7 may be uncoupled from the plurality of coupling members 27 in order to uncouple the support 3 and the frame 5. As such, in one or more embodiments, the plurality of snaps 57 of a rotary ring 7 may be a form of pull-type snaps which permit the snaps 57 to be lifted and elastically deform in a radial direction with respect to the first axis 15. In this way, a rotary ring 7 may be uncoupled from a coupling member 27 by lifting each snap 57 of the rotary ring 7 until the plurality of noses 41 of the coupling member 27 no longer abut against the interiors of the plurality of snaps 57 formed by the windows 61. Then, the rotary ring 7 is rotated along the coupling member 27 about the first axis 15 until the plurality of noses 41 of the coupling member 27 are disposed within the plurality of notches 59 of the rotary ring 7. Subsequently, the body 45 of the rotary ring 7 may be removed from cylindrical protrusion 37 of the coupling member 27.

Figure 7:
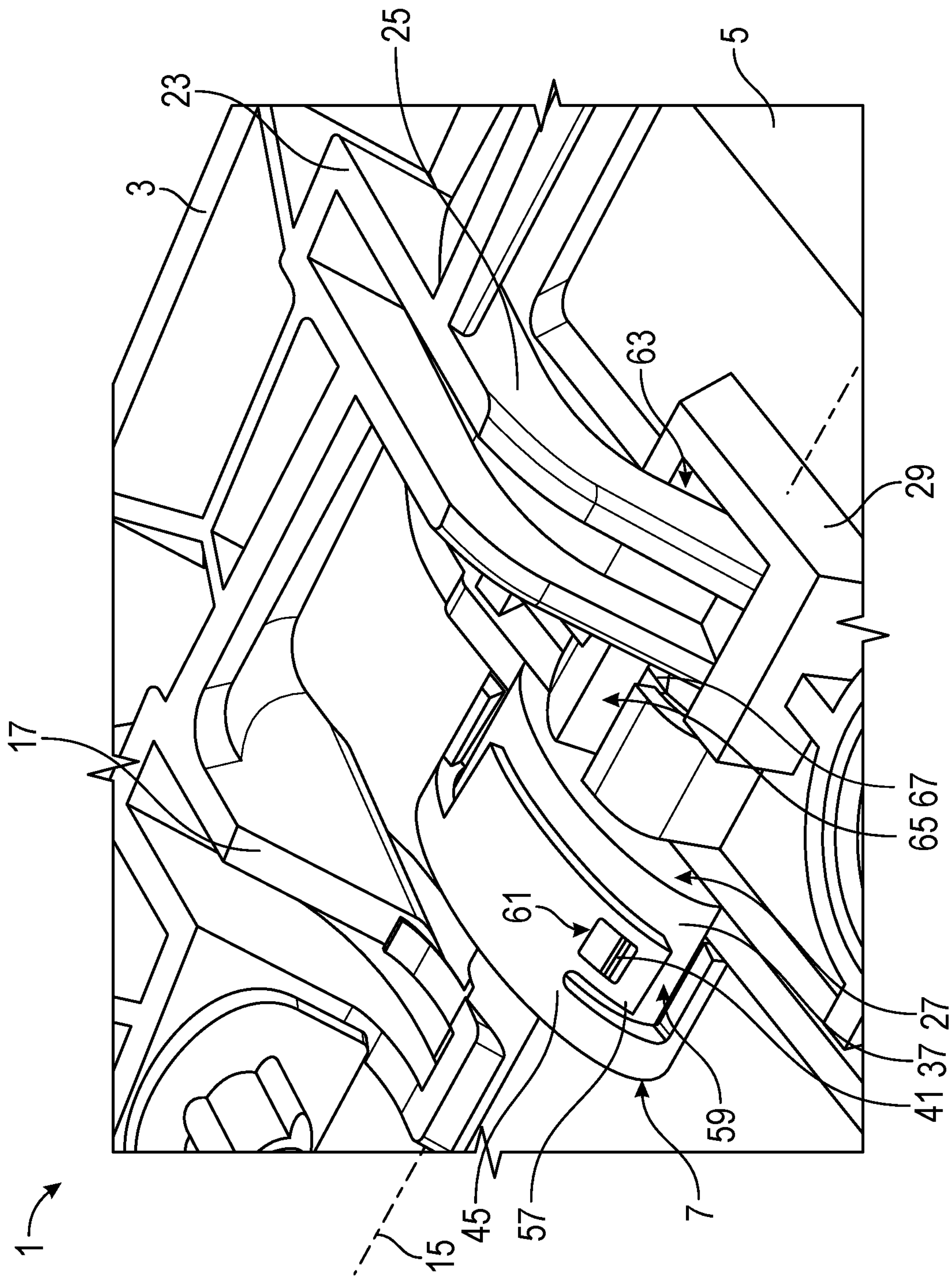
FIG. 7 shows a perspective view of a reflection device in accordance with one or more embodiments of the present disclosure.

FIG. 7 shows a distal end of a stopping leg 23 of the support 3 disposed within a stopping member 29 of the frame 5 in accordance with one or more embodiments of the present disclosure. Here, the stopping member 29 protrudes from the back side 35 of the frame 5 in a direction perpendicular to the first axis 15. The stopping member 29 includes a second recess 63 extending in a direction perpendicular to the first axis 15 such that the second recess 63 is configured to receive the distal end of a stopping leg 23 of the support 3. Further, the stopping member 29 includes a channel 65 that is formed as an adjacent opening to the second recess 63 and configured to receive the stopping element 67 of a stopping leg 23. In one or more embodiments, the recess of the stopping member 29 may extend fully through the frame 5.

The plurality of stopping members 29 are designed to limit deformation of the components (i.e., the plurality of fingers 47, the plurality of snaps 57, and/or the body 45) of the plurality of rotary rings 7 potentially produced by external forces acting upon the HUD and/or a vehicle (not shown) including the HUD. For example, the HUD may experience vibrations caused by the vehicle traveling on an unpaved roadway. In response, a stopping element 67 may abut against an interior of a corresponding stopping member 29.

Figure 8B:
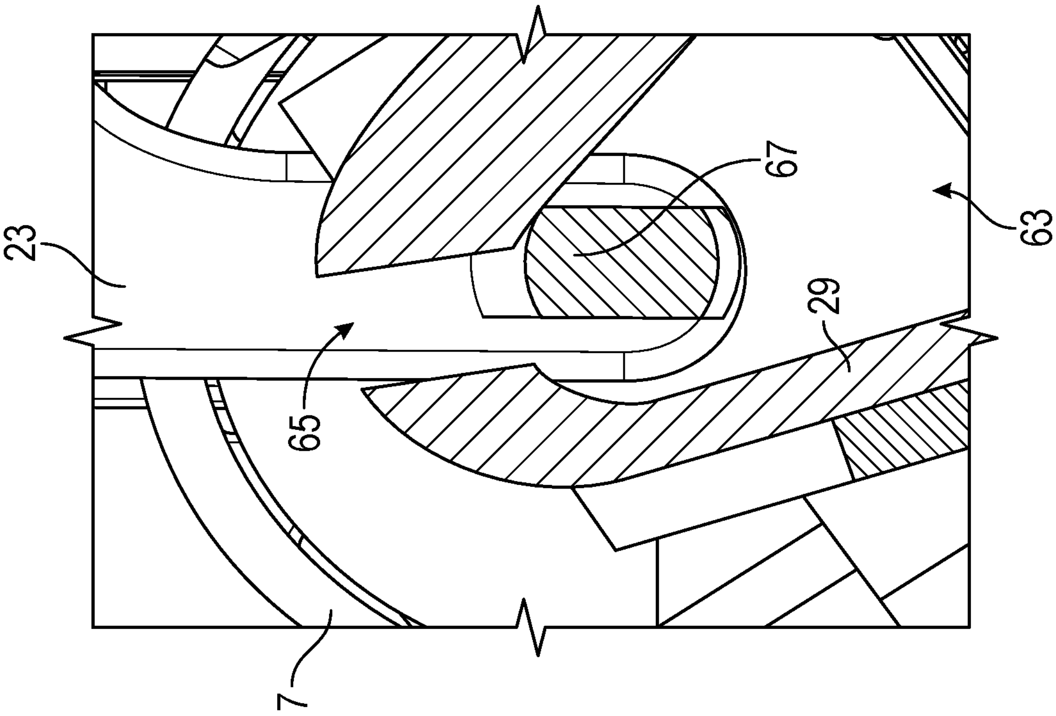
FIGS. 8A and 8B show diagrams depicting an operational sequence of the reflection device in accordance with one or more embodiments.
Figure 8A:
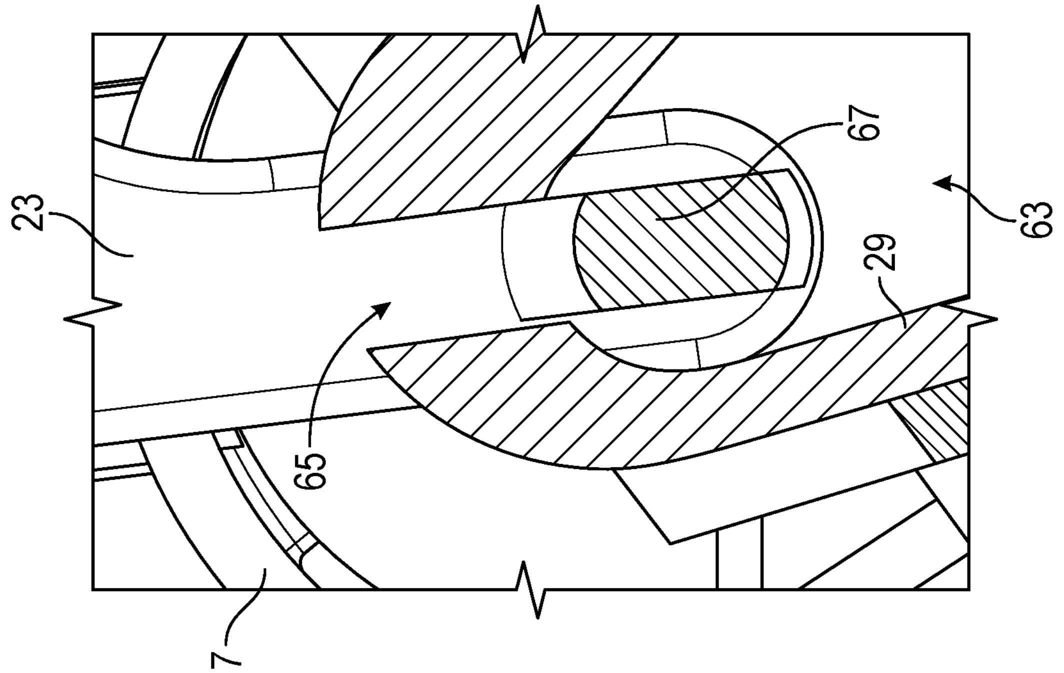

FIGS. 8A and 8B show cross-sectional diagrams depicting an operational sequence of a stopping element 67 within a stopping member 29 in accordance with one or more embodiments. Specifically, FIGS. 8A and 8B show the stopping element 67 within the stopping member 29 of FIG. 7 prior to and during an event producing external forces acting upon the HUD, respectively. Components of FIGS. 8A and 8B that are the same as or similar to components depicted in FIGS. 1-7 may not be redescribed for purposes of readability as they have the same functions as those described above.

FIG. 8A depicts a stopping element 67 within a second recess 63 of a stopping member 29. The recess of the stopping member 29 receives the stopping element 67 through a channel 65 of the stopping member 29 during assembly of the reflection device 1. During operation of the reflection device 1 without influence of an external force, the stopping element 67 is not in contact with the stopping member 29. In this way, during rotation of the frame 5 in relation to the support 3, friction is not produced between the stopping element 67 of a stopping leg 23 of the support 3 and the stopping member 29 of the frame 5. That is, the stopping member 29 may rotate contactless about the stopping element 67 and the first axis 15 during normal operation of the reflection device 1 without influence of an external force. However, the stopping element 67 may abut against an interior of the stopping member 29 under a mechanical shock condition above a predetermined value of force.

FIG. 8B depicts a stopping element 67 within a second recess 63 of a stopping member 29 during operation of the reflection device 1 with influence of an external force.

During operation of the reflection device 1 with influence of an external force, an interior of the stopping member 29 may abut against the stopping element 67 as depicted in FIG. 8B. Each stopping element 67 of the plurality of stopping legs 23 is designed to abut against an interior of a corresponding stopping member 29 based on a desired deformation limit of the plurality of rotary rings 7. In this way, the stopping elements 67 of the plurality of stopping legs 23 prevent permanent plastic deformation of the components of the plurality of rotary rings 7. Advantageously, the reflection device 1 is therefore more resistant to external forces such as vibrations.

In FIG. 8B, the plastic deformation of the plurality of rotary rings 7 is prevented by an interior of the stopping member 29 abutting against the stopping element 67. The moment contact is initiated between the stopping member 29 and the stopping element 67, one or more components of the plurality of rotary rings 7 have reached the desired deformation limit. Accordingly, while the stopping member 29 abuts against the stopping element 67, the stopping member 29 of the frame 5 transfers force to the stopping element 67 of a stopping leg 23 of the support 3. In addition, while the stopping member 29 abuts against the stopping element 67, further movement of the stopping member 29 in the same direction is prevented. Subsequent to the conclusion of the external force, the stopping member 29 may return to the previous position of FIG. 8A.

Figure 9:
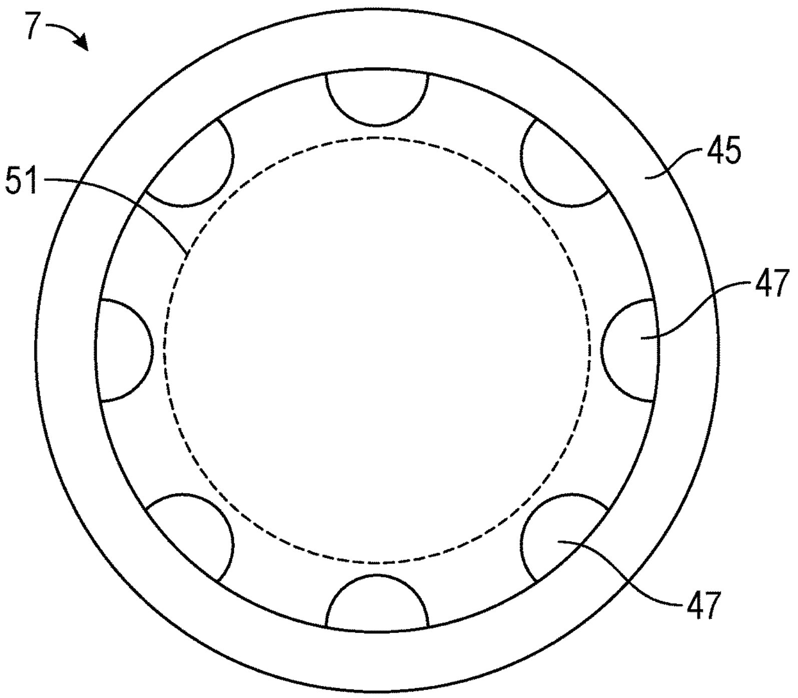
FIG. 9 shows a cross-sectional view of a rotary ring in accordance with one or more embodiments of the present disclosure.

FIG. 9 depicts a cross-sectional view of a rotary ring 7 in accordance with one or more embodiments of the present disclosure. In this embodiment, the rotary ring 7 is partially embodied as a form of rolling bearing. In this way, the rotary ring 7 may be designed to further reduce friction between the plurality of fingers 47 and a coupling element 21 when the rotary ring 7 is coupled to and rotated about the coupling element 21.

Specifically, in one or more embodiments, while the body 45 still includes a plurality of notches 59 and a plurality of snaps 57, the plurality of fingers 47 of the rotary ring 7 may be cylindrical or spherical rolling elements similar to those of a rolling bearing. As such, the body 45 may further include a cage (not shown) and a raceway (not shown), similar to a roller bearing. Accordingly, in one or more embodiments, the rotary ring 7 may be formed of a metallic material. In addition, in one or more embodiments, the rotary ring 7 may require lubrication.

Figure 10:
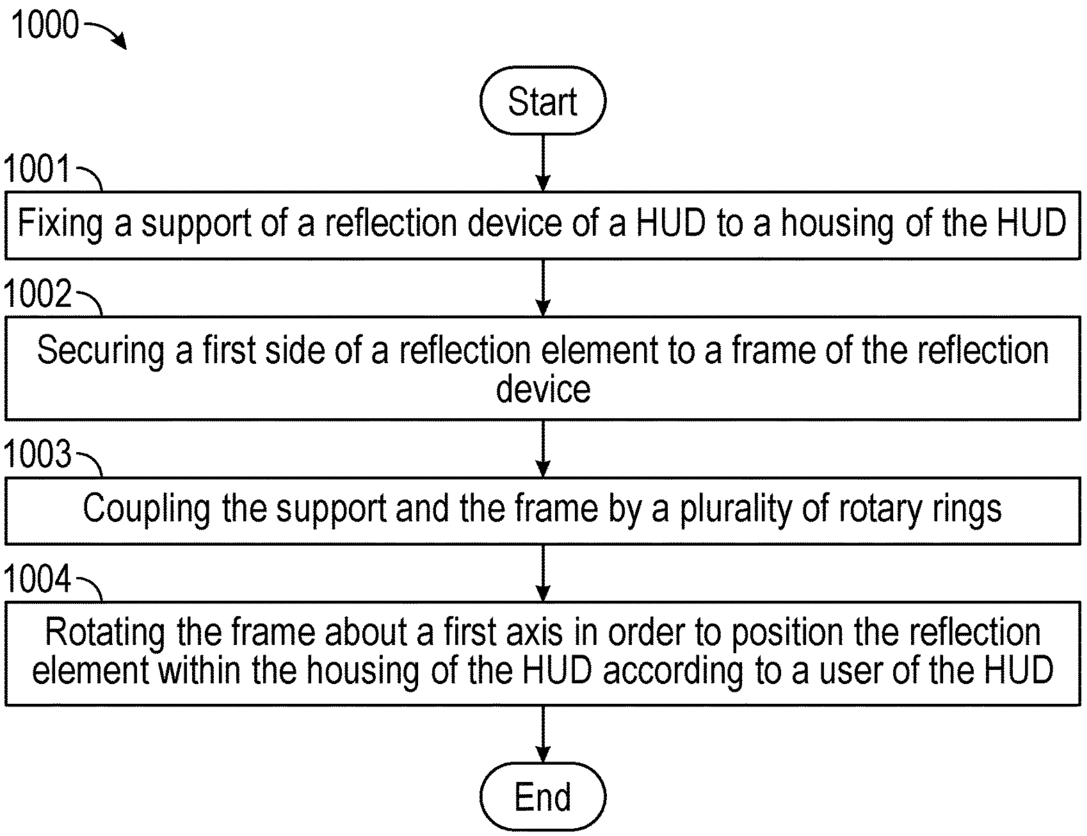
FIG. 10 shows a flowchart of a method in accordance with one or more embodiments of the present disclosure.

FIG. 10 depicts a flowchart 1000 showing a method for mounting a reflection device 1 of a HUD. While the various flowchart blocks in FIG. 10 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In block 1001, a support 3 of the reflection device 1 is mounted and rigidly fixed to a housing of the HUD. The HUD may be located within an automobile, aircraft, or another form of vehicle which utilizes a HUD known to those of ordinary skill in the art. The support 3 may be fixed to the housing of the HUD by way of screws, bolts, glue, snap connectors, or any other connection means known to those of ordinary skill in the art.

In block 1002, a reflection element 9 is secured to a frame 5. Specifically, a first side 31 of the reflection element 9 is fixed to a front side of the frame 5 by glue, tape, suction, clips, screws, or any other mounting means. In this way, the reflection element 9 of the reflective device 1 is supported by the frame 5. In one or more embodiments, the frame 5 is rotatable about a first axis 15 of the reflection device 1 in order to position (i.e., rotate) the reflection element 9 within the housing of the HUD.

In block 1003, a plurality of rotary rings 7 are utilized to couple the support 3 and the frame 5. In one or more embodiments, the plurality of rotary rings 7 are first coupled to a plurality of coupling legs 17 of the support 3.

The steps below describe a process of coupling a rotary ring 7 to a coupling leg 17 for ease of readability. However, in one or more embodiments, this process may be performed simultaneously or repeated for the coupling of each rotary ring 7 of the plurality of rotary rings 7 with each coupling leg 17 of the plurality of coupling legs 17.

Accordingly, a coupling element 21 extending along the first axis 15 from a coupling leg 17 is inserted through an opening 53 of a tubular body 45 of a rotary ring 7. More specifically, the coupling element 21 is passed through a finger opening 51 of the rotary ring 7 formed by a plurality of fingers 47 protruding from an interior wall 49 of the body 45. In one or more embodiments, the diameter of the finger opening 51 is less than the diameter of the coupling element 21. Consequently, the plurality of fingers 47 may deform elastically, bend, or otherwise move in order to accommodate the coupling element 21. Subsequently, each finger 47 of the plurality of fingers 47 applies a normal force against the coupling element 21. In one or more embodiments, the plurality of fingers 47 are evenly spaced along the interior wall 49 of the body 45 and includes at least three fingers 47. In this way, the coupling element 21 is held in place and coupled to the rotary ring 7.

After being coupled to a coupling element 21 of a coupling leg 17 of the support 3, each rotary ring 7 of the plurality of rotary rings 7 is further coupled to a coupling member 27 of the frame 5.

The steps below describe a process of coupling a rotary ring 7 to a coupling member 27 for ease of readability. However, in one or more embodiments, this process may be performed simultaneously or repeated for the coupling of each rotary ring 7 of the plurality of rotary rings 7 with each coupling member 27 of the plurality of coupling members 27.

In order to couple a rotary ring 7 to a coupling member 27, the body 45 of the rotary ring 7 is placed over a cylindrical protrusion 37 of the coupling member 27. In one or more embodiments, the outer diameter of the cylindrical protrusion 37 is similar to the diameter of the interior wall 49 of the body 45. In addition, in one or more embodiments, prior to placing the body 45 over the cylindrical protrusion 37, the rotary ring 7 may be rotated about the first axis 15 in order to align a plurality of noses 41 protruding outwardly from an outer surface 43 of the cylindrical protrusion 37 with a plurality of notches 59 along the body 45.

Once the body 45 is placed upon the coupling member 27, the body 45 is rotated about the first axis 15 in relation to the coupling member 27. In one or more embodiments, the coupling member 27 and the coupling element 21 previously coupled to the rotary ring 7 are stationary while the body 45 is rotated about the first axis 15. While the body 45 is rotated, a plurality of snaps 57 formed along the body 45 of the rotary ring 7 by the plurality of notches 59 are passed over the plurality of noses 41 of the cylindrical protrusion 37 of the coupling member 27. In doing so, a window 61 of each snap 57 of the plurality of snaps 57 receives a nose 41 of the plurality of noses 41. Subsequently, the plurality of noses 41 abut against the interiors of the plurality of snaps 57 formed by the windows 61, thereby preventing further rotation of the rotary ring 7. In this position, the rotary ring 7 is now coupled to the coupling member 27, and thus, a coupling leg 17 of the support 3 is now coupled to a coupling member 27 of the frame 5. In one or more embodiments, the coupling of the rotary ring 7 to the coupling member 27 rigidly fixes the rotary ring 7 to the coupling member 27.

In one or more embodiments, the support 3 includes a plurality of stopping legs 23 and the frame 5 includes a plurality of stopping members 29. Each stopping leg 23 protrudes from the support 3 in a direction perpendicular to the first axis 15 and includes a stopping element 67 that extends from the stopping leg 23 along the first axis 15. Each stopping member 29 of the plurality of stopping members 29 protrudes from a back side 35 of the frame 5 in a direction perpendicular to the first axis 15. Further, each stopping member 29 includes a second recess 63 extending in a direction perpendicular to the first axis 15 such that the second recess 63 is configured to receive the distal end of a stopping leg 23 of the support 3. In addition, each stopping member 29 includes a channel 65 that is formed as an adjacent opening to the second recess 63 and configured to receive the stopping element 67 of a stopping leg 23. Accordingly, simultaneous to the coupling of the plurality of rotary rings 7 to the plurality of coupling members 27, each stopping member 29 of the plurality of stopping members 29 of the frame 5 receives a stopping element 67 of the plurality of stopping legs 23 of the support 3.

Furthermore, in one or more embodiments, the support 3 and the frame 5 may also be connected to one another by a spring 11 for added stability between the support 3 and the frame 5 and additional support for the rotation mechanism 13.

In block 1004, the frame 5 is rotated about the first axis 15 in relation to the support 3 which is fixed to the housing of the HUD. In this way, the position of the reflection element 9 within the HUD may be manipulated according to a user of the HUD.

In one or more embodiments, the frame 5 is rotated by a rotation mechanism 13 that is connected to the frame 5. In one or more embodiments, the rotation mechanism 13 may be connected to a leg 33 that protrudes from the back side 35 of the frame 5, extending in a direction perpendicular to the first axis 15. In this way, an end of the rotation mechanism 13 may apply a force upon the leg in order to rotate the frame 5 about the first axis 15. In one or more embodiments, the rotation mechanism 13 may be in the form of a linear actuator. Further, in one or more embodiments, the rotation mechanism 13 may be electric.

During rotation of the frame 5, each rotary ring 7, fixed to a corresponding coupling member 27, is rotated about the first axis 15 and a corresponding coupling element 21 that is coupled to the rotary ring 7. Since the contact between each coupling element 21 and the plurality of fingers 47 of each rotary ring 7 is merely point contact, there is little friction between the plurality of rotary rings 7 and corresponding coupling elements 21 during rotation of the frame 5.

In one or more embodiments, during normal operation (i.e., operation of the reflection device 1 without influence of an external force), each stopping member 29 is not in contact with the corresponding stopping element 67. Thus, during rotation of the frame 5, each stopping member 29 may rotate contactless about the corresponding stopping element 67 and the first axis 15.

However, during operation of the reflection device 1 with influence of an external force, an interior of one or more stopping members 29 may abut against corresponding stopping elements 67. Each stopping element 67 of the plurality of stopping legs 23 is designed to abut against an interior of a corresponding stopping member 29 based on a desired deformation limit of the plurality of rotary rings 7. In this way, the stopping elements 67 of the plurality of stopping legs 23 prevent permanent plastic deformation of the components of the plurality of rotary rings 7 (i.e., the plurality of fingers 47, the plurality of snaps 57, and/or the body 45). As such, while one or more stopping members 29 abut against corresponding stopping elements 67, the one or more stopping members 29 of the frame 5 transfer force to the corresponding stopping elements 67 of the plurality of stopping legs 23 of the support 3. In addition, while a stopping member 29 abuts against a stopping element 67, further movement of the stopping member 29 in the same direction is prevented. Subsequent to the conclusion of the external force, the plurality of stopping members 29 and corresponding stopping elements 67 are no longer in contact.

Accordingly, the aforementioned embodiments as disclosed relate to reflection devices 1 of a HUD and methods useful for mounting reflection devices 1 of a HUD. Advantageously, the disclosed devices and methods employ a more robust design than current reflection devices in the industry by employing a snap-fit assembly. In addition, the disclosed devices and methods may advantageously provide an easier and more reliable assembly compared to current reflection devices in the industry. Further, the snap-fit design of the disclosed devices and methods advantageously ensure smooth operation and eliminate freeplay and noise within the devices. Moreover, the disclosed devices and methods may advantageously require less components than the current reflection devices in the industry, and thus, may reduce the costs associated with the devices and methods.

Although only a few embodiments of the invention have been described in detail above, those skilled in the art will readily appreciate that many modifications are possible in the example embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke AIA 35 U.S.C. § 112 (f) for any limitations of any of the claims herein, except for those in which the claim expressly uses the words 'means for' together with an associated function.

What is claimed is:

1. A reflection device of a Head Up Display (HUD), the reflection device comprising:

a support rigidly fixed to a housing of the HUD, wherein the support comprises a plurality of coupling legs, wherein each coupling leg of the plurality of coupling legs comprises a coupling element extending axially along the first axis;

a frame rotatable about a first axis, wherein the frame comprises a plurality of coupling members, each coupling member comprising;

a cylindrical protrusion;

a first recess formed within the cylindrical protrusion and configured to receive the coupling element of a coupling leg of the plurality of coupling legs of the support; and a plurality of noses protruding outwardly from the cylindrical protrusion;

a reflection element comprising:

a first side fixed to the frame; and a second side that is reflective and opposite of the first side; and a plurality of rotary rings configured to couple the support and the frame.

2. The reflection device according to claim 1, wherein each rotary ring of the plurality of rotary rings comprises:

a body comprising an opening and a plurality of snaps; and a plurality of fingers protruding inwardly from an interior wall of the body and configured to couple with the coupling element of a coupling leg of the plurality of coupling legs of the support;

wherein the plurality of snaps are formed by a plurality of notches along the body; and wherein each snap of the plurality of snaps comprises a window configured to couple with a nose of the plurality of noses of a coupling member of the plurality of coupling members of the frame.

3. The reflection device according to claim 2, wherein the plurality of snaps are tapered.

4. The reflection device according to claim 1, wherein the support comprises a plurality of stopping legs.

5. The reflection device according to claim 4, wherein the frame comprises a plurality of stopping members, each stopping member comprising:

a second recess configured to receive a stopping element of a stopping leg of the plurality of stopping legs.

6. The reflection device according to claim 5, wherein each stopping element of the plurality of stopping legs extends axially along the first axis.

7. The reflection device according to claim 1, wherein the reflection device further comprises a spring connected to the support and the frame.

8. The reflection device according to claim 1, wherein the reflection device further comprises a rotation mechanism connected to the frame, the rotation mechanism configured to rotate the frame in relation to the support about the first axis.

9. A method for mounting a reflection device of a Head Up Display (HUD) and positioning a reflection element of the reflection device within a housing of the HUD, the method comprising:

fixing a support of the reflection device to the housing of the HUD;

securing a first side of the reflection element to a frame of the reflection device, the reflection element further comprising a second side that is reflective and opposite of the first side;

coupling the support and the frame by a plurality of rotary rings;

rotating the frame about a first axis;

coupling the plurality of rotary rings to a plurality of coupling legs of the support includes inserting, in a direction parallel to the first axis, a coupling element of each coupling leg into an opening of a body of each rotary ring of the plurality of rotary rings; and coupling each rotary ring of the plurality of rotary rings to the coupling element of each coupling leg of the plurality of coupling legs by a plurality of fingers protruding inwardly from an interior wall of the body of each rotary ring.

10. The method according to claim 9, wherein the coupling of the support and the frame by the plurality of rotary rings comprises coupling a body of each rotary ring to a different coupling member of a plurality of coupling members of the frame, each coupling member comprising:

a cylindrical protrusion;

a first recess formed within the cylindrical protrusion and configured to receive a coupling element of a coupling leg of the plurality of coupling legs of the support; and a plurality of noses protruding outwardly from the cylindrical protrusion.

11. The method according to claim 10, wherein the coupling of the body of a rotary ring of the plurality of rotary rings to a coupling member of the plurality of coupling members of the frame comprises:

aligning the plurality of noses of the cylindrical protrusion of the coupling member with a plurality of notches of the body of the rotary ring;

inserting, in a direction parallel to the first axis, the cylindrical protrusion of the coupling member within an opening of the body; and rotating the rotary ring about the first axis until each nose of the plurality of noses of the coupling member couple with a window of a snap of a plurality of snaps formed along the body of the rotary ring by the plurality of notches.

12. The method according to claim 9, further comprising inserting a stopping element of each stopping leg of a plurality of stopping legs of the support into a second recess of each stopping member of a plurality of stopping members of the frame.

13. The method according to claim 9, further comprising connecting a spring to the support and the frame.

14. The method according to claim 9, wherein the rotating of the frame comprises actuating a rotation mechanism connected to the frame.

15. A method for mounting a reflection device of a Head Up Display (HUD) and positioning a reflection element of the reflection device within a housing of the HUD, the method comprising:

fixing a support of the reflection device to the housing of the HUD;

securing a first side of the reflection element to a frame of the reflection device, the reflection element further comprising a second side that is reflective and opposite of the first side;

coupling the support and the frame by a plurality of rotary rings;

coupling a body of each rotary ring to a different coupling member of a plurality of coupling members of the frame, each coupling member comprising:

a cylindrical protrusion;

a first recess formed within the cylindrical protrusion and configured to receive a coupling element of a coupling leg of the plurality of coupling legs of the support; and a plurality of noses protruding outwardly from the cylindrical protrusion; and rotating the frame about a first axis.

16. The method according to claim 15, wherein the coupling of the body of a rotary ring of the plurality of rotary rings to a coupling member of the plurality of coupling members of the frame comprises:

aligning the plurality of noses of the cylindrical protrusion of the coupling member with a plurality of notches of the body of the rotary ring;

inserting, in a direction parallel to the first axis, the cylindrical protrusion of the coupling member within an opening of the body; and rotating the rotary ring about the first axis until each nose of the plurality of noses of the coupling member couple with a window of a snap of a plurality of snaps formed along the body of the rotary ring by the plurality of notches.

* * * * *